United States Patent [19]

Hyma

[11] 4,372,575
[45] Feb. 8, 1983

[54] VEHICLE STRUT TYPE SUSPENSION WITH ALIGNMENT ADJUSTMENT

[75] Inventor: Marvin J. Hyma, Pontiac, Mich.

[73] Assignee: General Motors Corporation, Detroit, Mich.

[21] Appl. No.: 232,833

[22] Filed: Feb. 9, 1981

[51] Int. Cl.³ .............................................. B62D 17/00
[52] U.S. Cl. ................................ 280/661; 267/20 A; 280/668; 280/673
[58] Field of Search ............... 280/660, 661, 668, 673, 280/696; 267/20 A

[56] References Cited

U.S. PATENT DOCUMENTS

| | | | |
|---|---|---|---|
| 2,065,071 | 12/1936 | Harris | 280/661 |
| 2,299,926 | 10/1942 | Phelps | 280/670 |
| 4,175,771 | 11/1979 | Muzechuk | 280/696 |
| 4,200,307 | 4/1980 | Szabo | 280/668 |
| 4,213,631 | 7/1980 | Wilkerson | 280/661 |

*Primary Examiner*—Joseph P. Peters, Jr.
*Assistant Examiner*—John A. Carroll
*Attorney, Agent, or Firm*—Dean L. Ellis

[57] ABSTRACT

A vehicle wheel suspension including a strut member provided at its lower end with a wheel spindle and a connection with a lateral lower control arm, further includes mounting apparatus for attaching the upper end of the strut to a stamped sheet metal tower portion of the vehicle superstructure and having provisions for adjustment of either wheel caster or wheel camber via relative movement of the upper end of the strut relative to the tower.

1 Claim, 4 Drawing Figures

VEHICLE STRUT TYPE SUSPENSION WITH ALIGNMENT ADJUSTMENT

This invention relates to vehicle wheel suspensions of the so-called MacPherson strut type and to provisions in such type suspensions for accomplishing caster and/or camber adjustment of the wheel carried by such suspensions.

Elimination of weight while retaining spaciousness in passenger automobiles has resulted in the increasing use of integral body/frame superstructures of stamped, relatively thin sheet metal, and also in greater use of the strut type of wheel suspension. In the latter, a vertical strut member carries at its lower end the usual wheel knuckle and is there connected with a lateral control arm, the upper end of the strut member being mounted to a high portion of the vehicle superstructure. It is often desirable to provide caster and camber adjustment in this and other types of vehicle suspensions, but complications arise when attempting to incorporate such provisions in the strut type suspension without adding undue structural complexity to the strut structure, particularly where both caster and camber adjustment is desired.

A desirable expedient to provide for such adjustment is by altering the attitude of the strut axis through relative movement between the upper end of the strut and its attachment location in the vehicle superstructure, as by use of slotted fastener locations. Some such adjustment has been proposed in the past, but always in the environment of vehicle bodies using heavy frame members and attachments, i.e., where there is little concern for weight or any sacrifice of the strength of the superstructure as will arise from typical adjustable attachments. In the current environment of stamped sheet metal superstructures, heavy frame elements are unacceptable, and sheet metal strength is assiduously guarded.

The present invention has accomplished a solution to providing the desired adjustment capability in sheet metal superstructure and without sacrifice of strength of the latter. It includes upper strut mounting apparatus wherein caster and/or camber adjustment may be performed through the use of slotted members adjustably affixed to a thin stamped sheet metal tower of the vehicle superstructure by conventional threaded or like fasteners. Such members further serve to stiffen or reinforce the superstructure notwithstanding the slotting. Further, the strut mounting members are adapted to avoid adding any appreciable amount of weight, or of total overall strut height thereby to maintain a low vehicle profile. The invention also features a fastener retainer and reinforcing structure which improves vehicle assembly and service operations.

These and other objects, features and advantages of the invention will be readily apparent from the following specification and from the drawings wherein.

Figure 1:
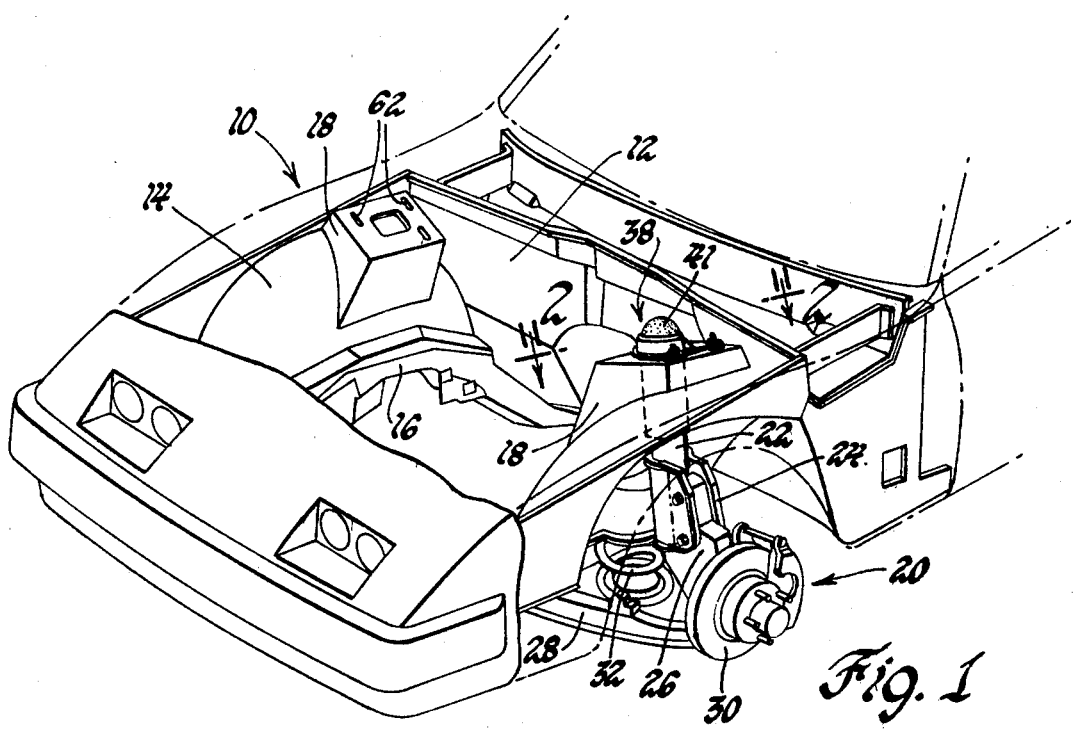
FIG. 1 is a partially broken away perspective view of a vehicle body including a strut type suspension and adjustable upper mounting apparatus therefor according to the invention.

Referring now particularly to FIG. 1 of the drawings a vehicle body designated generally as 10 is of so-called integral frame/body construction and features the use of a plurality of stamped and welded relatively lightweight sheet metal super-structure assemblies. In the forward compartment area of such body as shown, such superstructure includes a stamped dash panel assembly 12 joined by welding or the like with a motor compartment side panel assembly 14. Each such panel assembly comprises a number of individual panels formed of stamped sheet metal, each reinforced by suitable turned flanges, depressions and upsets. Likewise a rail assembly 16, similarly formed of stamped sheet panels welded together in box-like configuration, extends forwardly on either side of the motor compartment and is welded to the dash panel and motor compartment assemblies 12 and 14.

To accommodate that strut type front wheel suspension, particularly one with adequate stroke, this illustrative embodiment incorporates within the side panel assembly 14 a box-like strut mounting tower 18 at a high location. It is again formed of relatively lightweight sheet metal and either integrally formed with the large panel of the panel assembly 14 or separately formed and welded thereto. Such tower includes a flat generally horizontal mounting surface for purposes to be described.

The front suspension assembly at each side of vehicle body 10 is designated generally as 20 and is of well-known type including a strut member 22 comprised of upper and lower telescopic portions, not shown, incorporating a hydraulic shock absorber. A saddle-type knuckle mounting bracket 24 is welded to the lower telescopic portion of the strut member 22, and a forged or like-formed wheel knuckle and spindle member 26 is received between flanges of the bracket 24 and fixed thereto as by bolts. Suspension 20 further includes a lower control arm 28 extending laterally from conventional rubber bushed inward pivots, at longitudinally spaced locations on frame rail assembly 16, to a ball joint or like outer connection, not shown, with the knuckle and spindle member 26. A disk-type brake and wheel hub assembly designated generally as 30, is mounted in known manner on the knuckle and spindle member 26. A coil suspension spring 32 is interposed between an upper surface of the control arm 28 and a reaction mount panel portion of the motor compartment side panel assembly 14.

Figure 2:
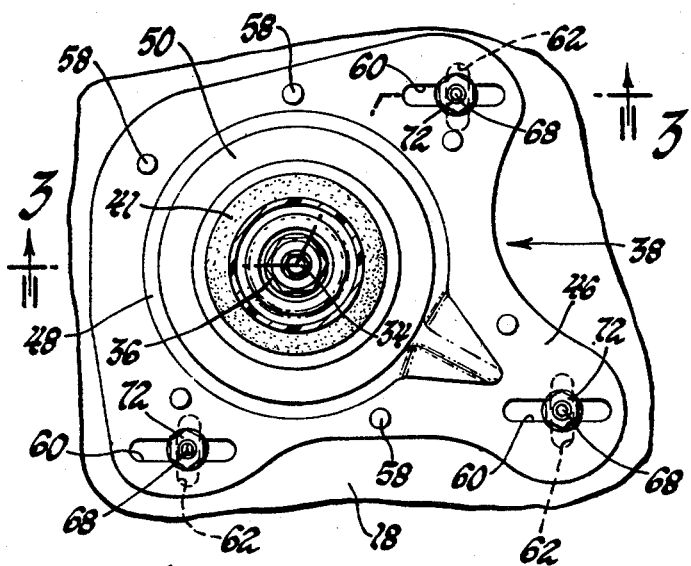
FIG. 2 is a fragmentary partially broken away plan view of the upper end mounting apparatus of the invention taken generally along the plane indicated by lines 2—2 of FIG. 1.
Figure 3:
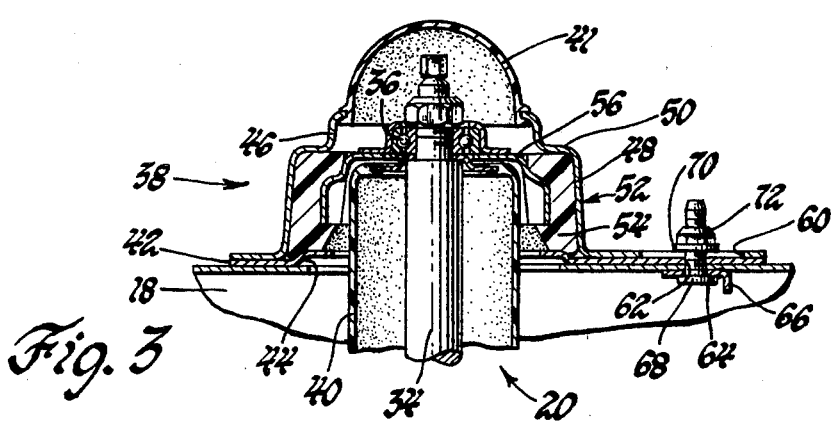
FIG. 3 is a sectional view taken generally along the planes indicated by lines 3—3 of FIG. 2.

Referring now to FIGS. 2 and 3, the upper telescopic portion of the strut member 22 comprises a shock absorber rod element 34 terminating in a threaded end with nut attached. The inner race of a bearing 36 is captured therebetween, such bearing accommodating steering rotation of the strut 22 in known manner.

Figure 4:
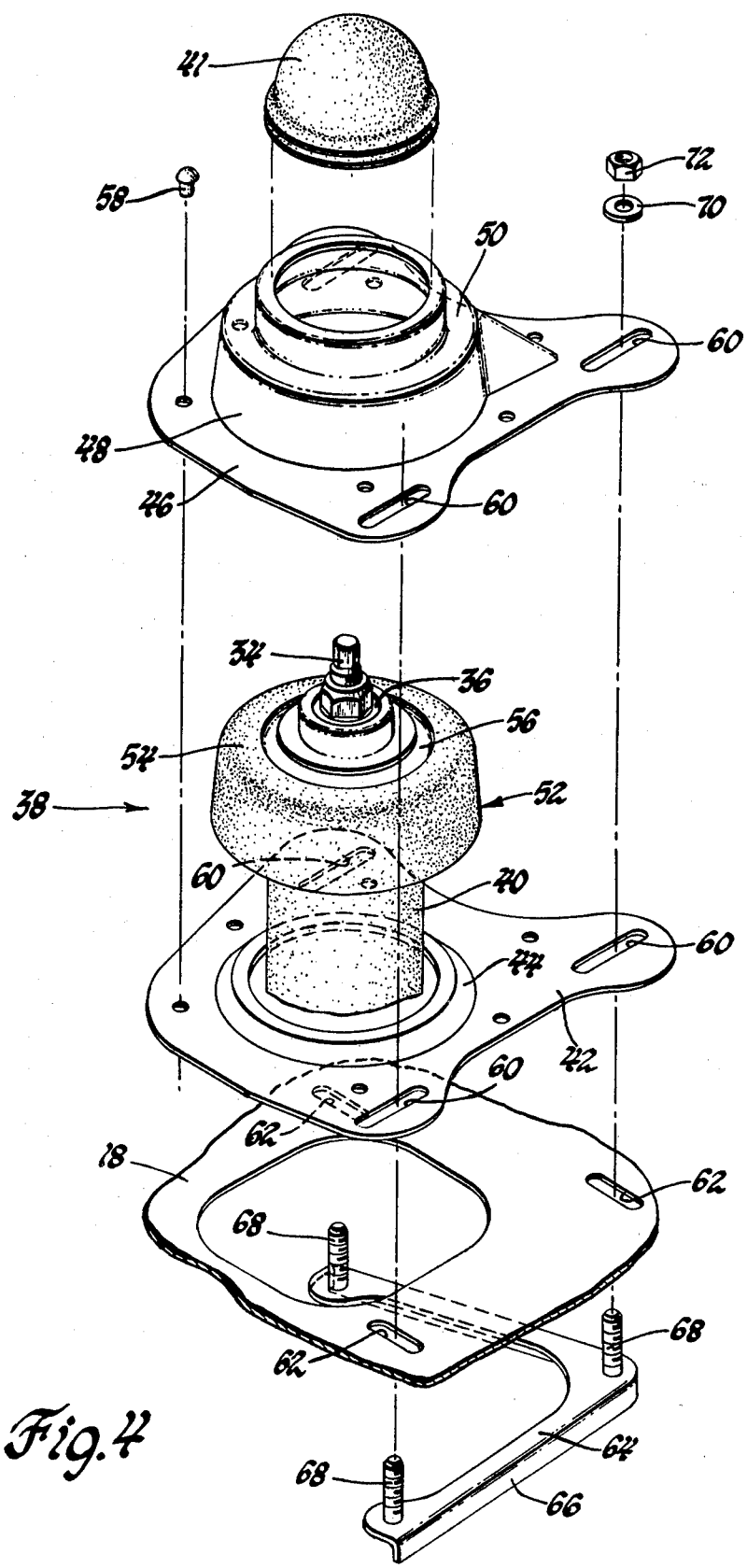
FIG. 4 is an exploded perspective view.

A strut mounting upper plate assembly, designated generally as 38, is located atop tower 18. It is structured as an inverted dish with a large internal cavity receiving the shock rod 34. A rubber or like sheath 40 covers the latter. Another cover 41 of rubber or the like closes a service access port of the mounting plate assembly 38. As also seen in FIG. 4, the mounting plate assembly 38 comprises a centrally apertured lower plate 42 stamped with an annular rib 44 around the central aperture. An upper plate 46, shaped complementary in plan view to the lower plate, is likewise stamped with the deep inverted dish or annular crown 48 having an annular flange 50. Interposed within crown 48 between such flange 50 and the lower plate 42 is an isolation bushing subassembly 52. Such subassembly comprises a rubber or like-material bushing element 54 provided with a bonded central disc-shaped sheet metal retention element 56 to which is affixed as by welds or rivets the outer race of bearing 36.

The mounting plate assembly 38 features further the provision of fastener locations within the complementarily shaped flanges of the upper and lower plates 42 and 46, specifically by slots 60 with parallel axes and centered on points widely spaced about the axis of shock rod 34. Such mounting plate assembly 38 is fabricated in sandwich style as a permanent unit by use of rivets at several locations, indicated at 58, through the mating flanges of the upper and lower plates.

The horizontal surface of tower 18 is similarly slotted at 62 at locations juxtaposed generally to the slot locations 60 of the mounting plate assembly, and along parallel axes arranged perpendicularly to parallel axes of the slots 60. Thus, the upper mounting plate assembly 38 is adapted for securement to such surface of the tower 18 through slots 60 and 62, by means of threaded studs or like fasteners.

At the underside of such surface of tower 18 there lies opposed to the mounting plate assembly 38 a reinforcing member 64 of dimension sufficient to encompass all of the mated slots 60 and 62 thereabove. It is stamped and includes a turned rigidifying flange 66. With such breadth and self-rigidity, it can act as a clampable reinforcement of tower 18. While preferably of "L" shape as shown, it is of course practical to configure this member as a rectangular or like plate which surrounds the strut member 22, but with some sacrifice in ease of assembly as compared to the L-shape.

Member 64, in addition to its reinforcing function, may serve as a convenient retainer for a series of threaded studs 68 staked thereto. These may be inserted upwardly in a single motion through the juxtaposed slots 60 and 62 of the mounting plate assembly 38 and tower 18. Thus, the upper end of the strut member 22 is readily secured to tower 18 of the vehicle body by tightening over studs 68 and washers 70 of threaded nuts 72 to firmly clamp the tower between the rigid members 38 and 64.

Slots 60 and 62 accommodate a defined range of adjustment of both caster and camber for the strut member 22 and wheel hub 30 via relative movement between the mounting plate assembly 38, member 64 and tower 18. Such adjustment may proceed individually either in movement of assembly 38 and member 64 within slots 62 in direction forwardly and rearwardly of the vehicle for caster, or movement of assembly 38 inboard and outboard within slots 62 for camber, or simultaneously in both directions. This is accomplished merely by loosening of nuts 72 to permit inclining the axis of the entire strut member 22 to the desired attitude both longitudinally and inboard-outboard of the vehicle superstructure.

A number of alternative arrangements to that illustrated herein is of course available within the spirit of the invention and could include, for example, locating the mounting plate assembly 38 underneath the tower 18 and applying the reinforcing member 64 to the top surface thereof. Ease of assembly may dictate that in certain situations it is preferable to reverse the threaded studs and nuts between the assembly 38 and the member 64. It is practical to merely utilize apertures in member 64 and not employ it as a fastener retainer. But generally, the use of such member as a retainer for fastener elements, whether studs or nuts, is of definite advantage in conveniently assembling the strut suspension both during manufacture and field service operations.

The embodiments of the invention in which an exclusive property or privilege is claimed are defined as follows:

1. In a vehicle wheel spring suspension including a strut member on a generally vertical axis of the vehicle and connected adjacent its lower end with wheel spindle means and with a link member swingably mounted on the sprung vehicle superstructure, upper end mounting apparatus for said strut member, comprising, a thin sheet metal superstructure panel including a generally flat mounting tower portion above the strut proper oriented in a plane substantially orthogonal with said strut axis, an upper strut mounting plate assembly lying against the upper side of said tower portion and including an isolation element on said axis which receives the upper end of said strut, said plate assembly having defined therein a set of slots on parallel axes and widely spaced about said axis, a stud retainer and tower reinforcing member lying against the underside of said tower portion and of a breadth to lie opposed to said set of slots of said plate assembly, said tower portion having therein a set of slots juxtaposed to said set of plate assembly slots and arranged on axes perpendicular to the axes thereof, said stud retainer and reinforcing member having affixed thereto a set of threaded studs projecting through the juxtaposed said sets of slots, and nuts threaded over said studs whereby to clamp the tower portion in reinforcing engagement between said plate assembly and said member and whereby either strut camber or strut caster or both may be adjusted by loosening of said nuts for movement of said plate assembly relative to said mounting tower portion.

* * * * *